United States Patent
Raine

(10) Patent No.: US 12,523,199 B2
(45) Date of Patent: Jan. 13, 2026

(54) SYSTEMS AND METHODS FOR MODULAR PUMPED STORAGE HYDROPOWER

(71) Applicant: ENERGY FUTURE INC., New York, NY (US)

(72) Inventor: Brian Raine, Houston, TX (US)

(73) Assignee: ENERGY FUTURE INC.

( * ) Notice: Subject to any disclaimer, the term of this patent is extended or adjusted under 35 U.S.C. 154(b) by 0 days.

(21) Appl. No.: 18/744,714

(22) Filed: Jun. 17, 2024

(65) Prior Publication Data
US 2024/0426280 A1    Dec. 26, 2024

Related U.S. Application Data

(60) Provisional application No. 63/521,114, filed on Jun. 15, 2023.

(51) Int. Cl.
*F03G 3/00* (2006.01)
*F03B 13/06* (2006.01)

(52) U.S. Cl.
CPC .............. *F03G 3/094* (2021.08); *F03B 13/06* (2013.01); *F05B 2260/422* (2020.08)

(58) Field of Classification Search
CPC .......... F03B 13/06; Y02E 10/20; Y02E 60/16; F05B 2240/91; F05B 2240/95; Y02B 10/30

See application file for complete search history.

(56) References Cited

U.S. PATENT DOCUMENTS

| | | |
|---|---|---|
| 7,944,078 B1 | 5/2011 | Wang |
| 2018/0100480 A1 | 4/2018 | Duquette et al. |
| 2022/0260046 A1 * | 8/2022 | Medina ................... H02S 10/12 |

FOREIGN PATENT DOCUMENTS

| | | | |
|---|---|---|---|
| CN | 113417803 A | 9/2021 | |
| CN | 117927407 A | 4/2024 | |
| DE | 102018000134 A1 * | 7/2019 | .............. F03B 13/06 |

OTHER PUBLICATIONS

English Translation DE-102018000134-A1 (Year: 2018).*
English Translation DE-102018000134-A1 (Year: 2019).*

* cited by examiner

*Primary Examiner* — Shafiq Mian
(74) *Attorney, Agent, or Firm* — Gearhart Law LLC

(57) ABSTRACT

A modular pumped storage hydropower system may include a shaft having a first end located opposite a second end. A reservoir is connected to the first end of the shaft. The second end of the shaft is configured to be located under a surface of ground. The second end of the shaft has a first compartment and a second compartment. The first compartment retains a pump assembly having an inlet in hydro communication with the second compartment. The second compartment is configured to retain water. A pipe has a first end connected to the pump assembly located opposite a second end extending through a cover of the first end of the shaft. The second end of the pipe is in hydro communication with the reservoir. The pipe of the pump assembly transfers water from the second compartment of the second end of the shaft to the reservoir.

5 Claims, 20 Drawing Sheets

SYSTEMS AND METHODS FOR MODULAR PUMPED STORAGE HYDROPOWER

CROSS-REFERENCE TO RELATED APPLICATIONS

This application is a U.S. Non-Provisional Utility patent application entitled, "SYSTEMS AND METHODS FOR MODULAR PUMPED STORAGE HYDROPOWER" which claims priority to U.S. Provisional Patent Application No. 63/521,114, filed on Jun. 15, 2023 entitled, "SYSTEMS AND METHODS FOR MODULAR PUMPED STORAGE HYDROPOWER" the contents of which are hereby fully incorporated by reference.

FIELD OF THE EMBODIMENTS

This disclosure relates generally to stations or aggregates of water-storage type, e.g. comprising a turbine and a pump, and more particularly to a partially underground modular pumped storage hydropower (m-PSH) system.

BACKGROUND OF THE EMBODIMENTS

The electric power generation industrial sector is increasing reliance on energy generation from renewable sources such as wind and solar energy. The electric power generation from these renewable sources is often intermittent and benefits from the addition of electrical power storage for short, medium and long terms. Short term electrical energy storage may be provided by a chemical battery such as, a lithium-ion battery, a flywheel, and/or an intermittent fossil power generator. Many chemical batteries dissipate energy over time leading to energy loss. Long term electrical energy storage may be provided by hydro-storage. Although large scale hydro-storage systems may retain large quantities of energy for a long time, these systems are often geographically constrained.

Electric energy storage in the form of gravity potential energy is currently known. For example, pumped storage hydropower (PSH) is a type of hydroelectric energy storage. It is a configuration of two water reservoirs at different elevations that may generate power as water moves down from one to the other (discharge), passing through a turbine. The system also requires power as it pumps water back into the upper reservoir, known as recharge. PSH acts similarly to a large battery, because it is capable of storing power and then releasing the power on an as needed basis. Lifting and lowering a liquid mass by pumping water from a lower to a higher container or vice-versa of a closed container using electrical energy drawn from a power grid or other source is a known solution. The storage relies on a mass being lifted to a height, held at a higher elevation and lowered at the desired time. The energy stored by raising the mass and then being released by lowering the mass is a product of the mass, the height lifted and the gravitational acceleration constant. Electric energy storage in the form of gravity energy may supply electric energy back with a response time in the order of minutes or hours. For example, it can be cycled multiple times a day or at far less frequency depending on the energy generation cycle by the renewable sources of the power source and/or the consumer demand. Electric energy storage in the form of pumped storage energy may provide long storage time without energy dissipation. Pumped storage energy facilities can also provide ancillary services, including black-start capabilities, voltage support, and spinning reserves.

Typically, large scale hydroelectric power generation technologies and systems include facilities that are configured for location and installation at a site within, or adjacent to and at least partially within a mine shaft and/or a topography suitable for forming a water reservoir. It is currently known for an existing hydraulic reservoir to be located near a shore marine location such as, an ocean, a lake, an inland sea, an artificial lake, a large river, a delta, or an estuary site. Although the location of energy storage in partially underground facilities may have a sufficiently longer life and/or may not age prematurely compared to exclusively above-ground energy storage systems in today's market, they require a location with an existing hydraulic reservoir, which may be problematic at a site without an existing hydraulic reservoir. Thus, there is a continuing need for large scale facilities having large scale energy storage, in the order of tens to thousands of megawatt-hours being configured to store electric energy in the form of modular pumped storage energy at any location. As a result, installation of a PSH system would be more easily set-up and have a lower cost if the PSH system is constructed at a desired site without relying on a pre-existing configuration of a site and/or a preexisting hydraulic reservoir of a site.

However, in view of the prior art considered as a whole at the time the present invention was made; it was not obvious to those of ordinary skill in the pertinent art how the identified needs could be fulfilled.

SUMMARY OF THE EMBODIMENTS

In accordance with the principles of the present invention, a (m-PSH) system may include a shaft having a first end located opposite a second end. A reservoir is connected to the first end of the shaft. The second end of the shaft is configured to be located under a surface of ground. The second end of the shaft has a first compartment and a second compartment. The first compartment retains a pump assembly having an inlet in hydro communication with the second compartment. The second compartment is configured to retain water. A pipe has a first end connected to the pump assembly located opposite a second end extending through a cover of the first end of the shaft. The second end of the pipe is in hydro communication with the reservoir. The pipe of the pump assembly transfers water from the second compartment of the second end of the shaft to the reservoir, and which also includes improvements that overcome the limitations of prior modular electric energy storage structures, is now met by a new, useful, and non-obvious invention.

A modular cylindrical structure configured for storing electric energy in the form of pumped storage energy has an outer cylindrical wall, which may be made of any material including, but not limited to, steel, reinforced concrete, and/or a composite of steel and concrete, and/or mass or laminated timber. The cylindrical structure is orientated with its longitudinal axis vertically positioned in relation to the ground. The cylindrical structure is closed at the bottom and includes pipes that connect the lower and upper ends of the facility. The underground cylindrical structure enclosure creates a significant underground storage space that forms the lower reservoir. The upper storage space is in the form of an elevated storage tank located on top of the above ground projection of the cylindrical structure, similar to that form of structure used for municipal water storage in many locations internationally. Electric motors use electrical energy to pump water from the underground water storage area to the elevated water storage area. The electric motors can return electrical energy to the power grid and/or other loads when the water is allowed to flow backwards under gravity, for example through a process known as regenerative loading.

The facility may be constructed at any onshore site with reasonable ground conditions at a location with connection to a power grid. For example, the facility may be constructed as part of an electric power source, including, but not limited to, a farm of wind turbines and/or solar panels, which may only generate electric energy intermittently. The electric power source combining intermittent generation electric energy with storage of electric energy in the form of pumped hydro energy may allow for more uniform supply of electric energy to the power grid and/or a higher peak supply of electric energy to the power grid at times of higher demand and/or allow for increased renewable energy production by storing that production that is in excess of need at any given time.

BRIEF DESCRIPTION OF THE DRAWINGS

To more fully understand the invention, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 4E is an illustration of a partial top plan view of the (m-PSH) system of FIGS. 4B and 4C, according to at least some embodiments disclosed herein.

FIG. 4F is an illustration of an example circuit diagram of a Single-Serial-Parallel (SSP) pump regulation, according to at least some embodiments disclosed herein.

and the tower and tank elevation view, according to at least some embodiments disclosed herein.

Figure 13:
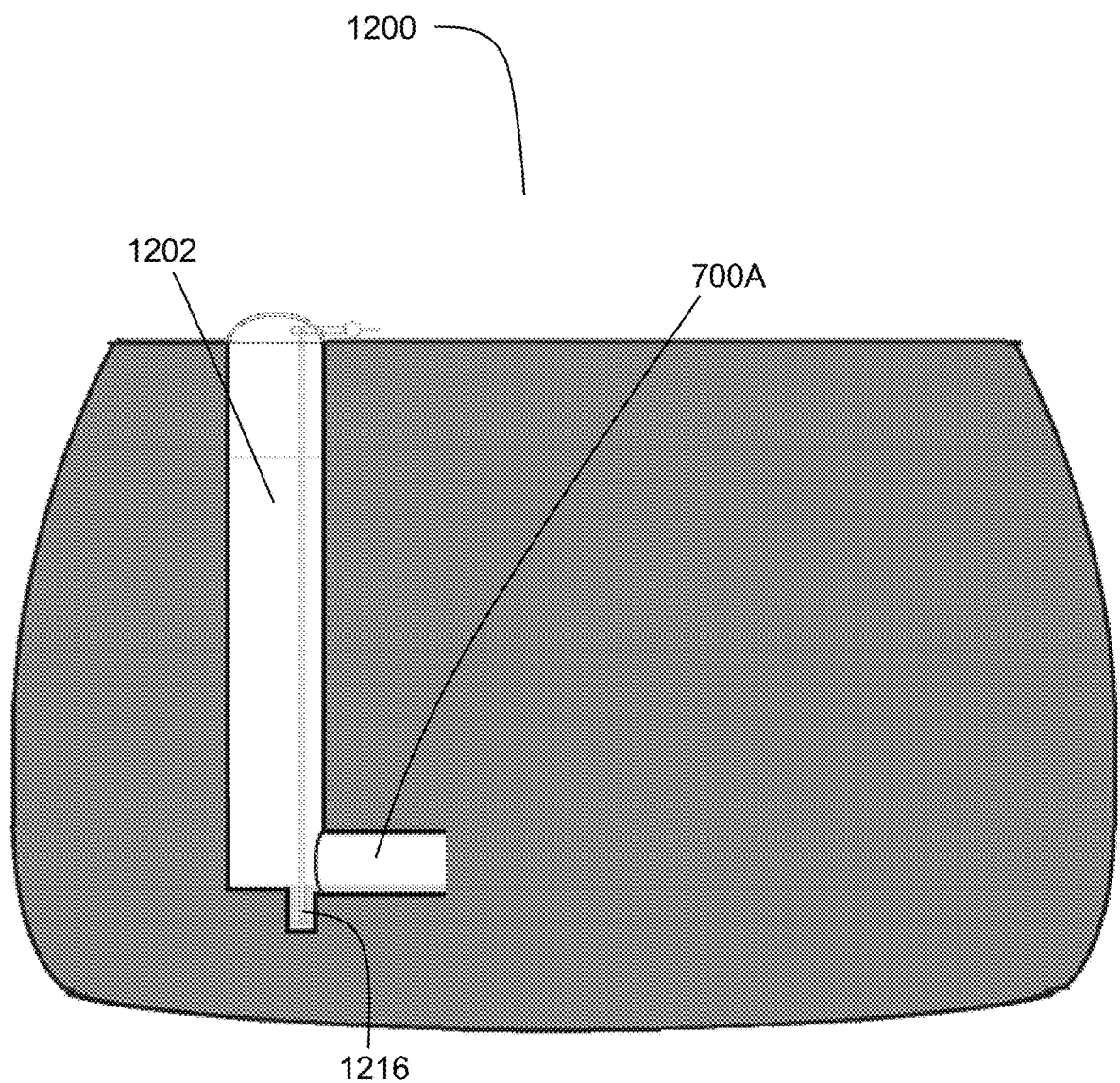

FIG. 13 is an illustration of a side cut-away view of an embodiment of the (m-PSH) system having a lower water storage chamber as illustrated earlier with dry well or caisson and low elevation pump(s) in a reduced cross section compartment with or without a lateral compartment as illustrated earlier, according to at least some embodiments disclosed herein.

Figure 14:
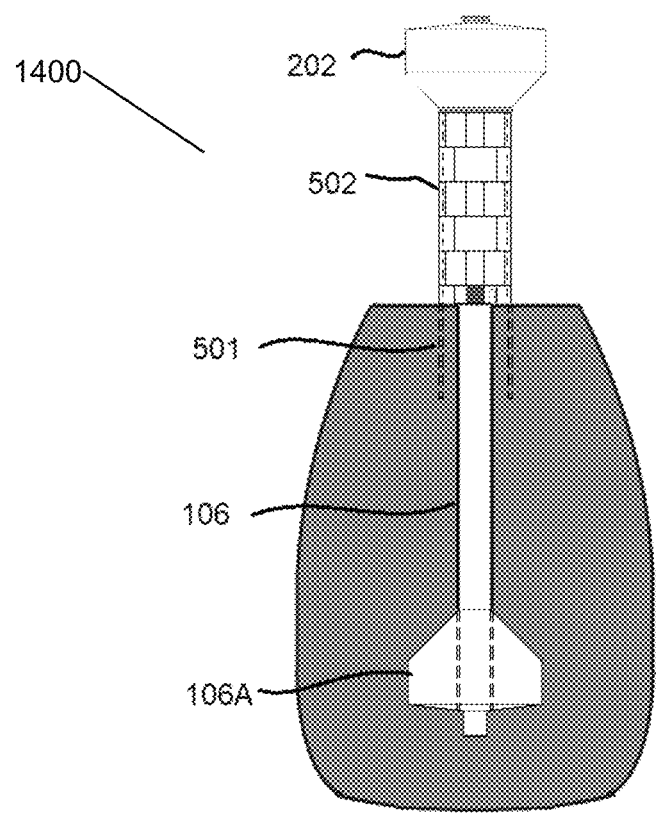

FIG. 14 is an illustration of a side cut-away view of an embodiment of a (m-PSH) system 1400 having an expanded lower water storage chamber as illustrated earlier with dry well or caisson and low elevation pump(s) in a reduced cross section between the expanded lower water storage chamber and ground level and the above ground shaft is constructed of a steel or concrete or timber or composite steel/concrete/timber materials and may be supported on an independent foundation, with or without a lateral compartment as illustrated earlier, according to at least some embodiments disclosed herein.

The figures depict various embodiments of the present invention for purposes of illustration only. One skilled in the art will readily recognize from the following description that other alternative embodiments of the structures and methods illustrated herein may be employed without departing from the principles of the invention described herein.

DESCRIPTION OF THE PREFERRED EMBODIMENTS

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Also, the exemplary embodiments presented below may be combined in any combination of ways, i.e., any element from one exemplary embodiment may be used in any other exemplary embodiment, without departing from the scope of the disclosure.

Figure 1:
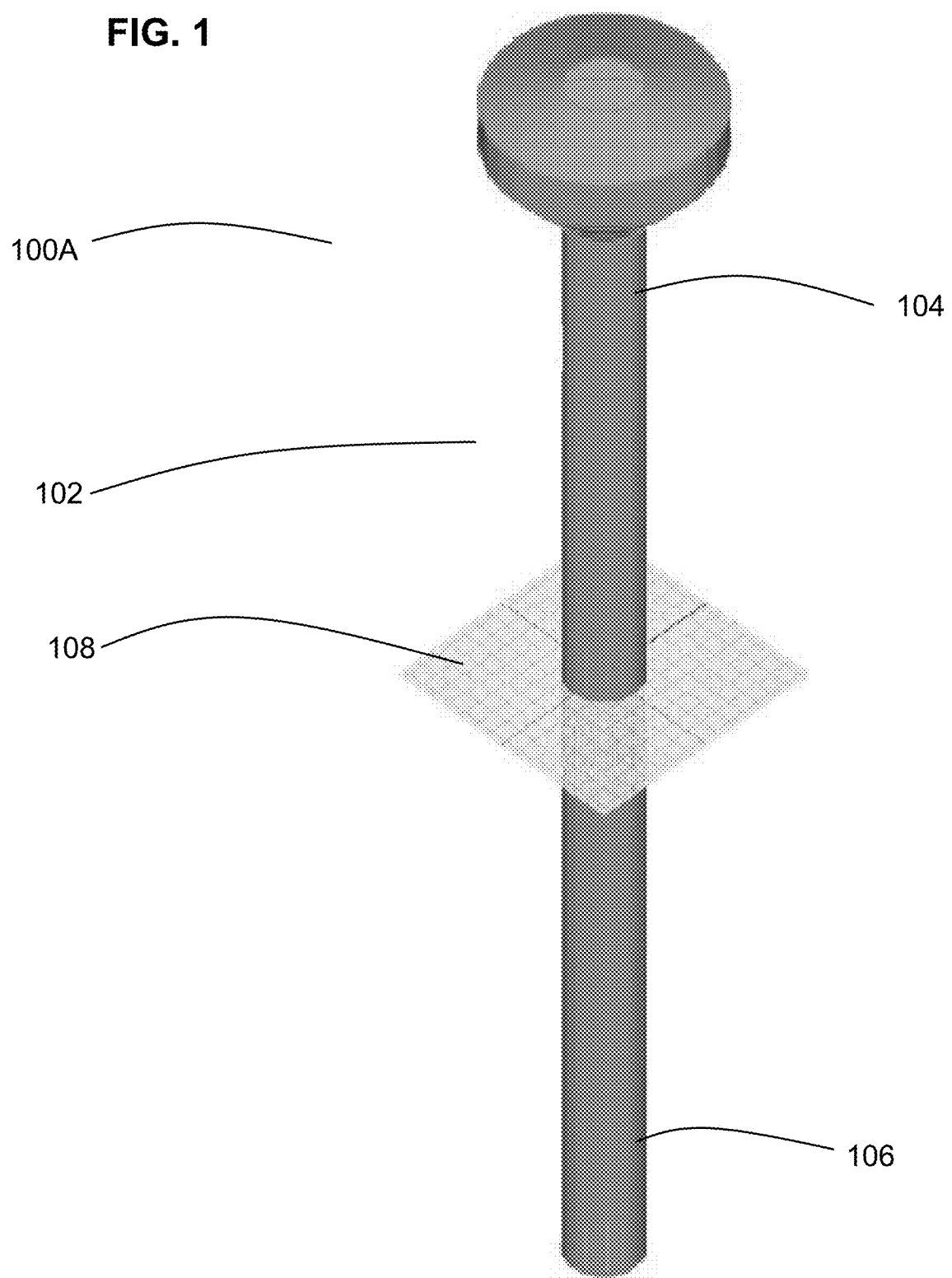
FIG. 1 is an illustration of a perspective view of a (m-PSH) system, according to at least some embodiments disclosed herein.
Figure 5:
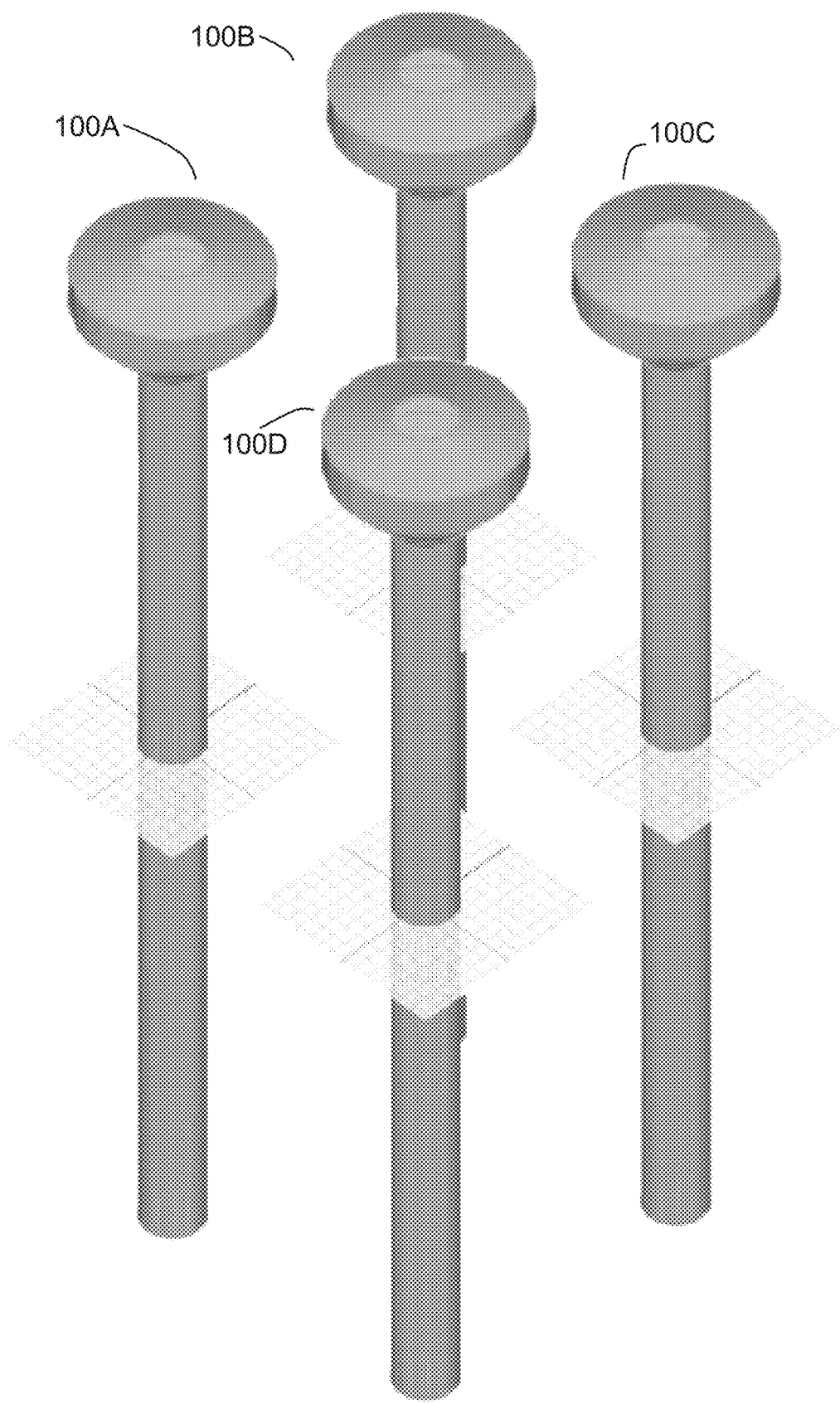
FIG. 5 is an illustration of a perspective view of an embodiment of a plurality of the (m-PSH) systems of FIG. 1, according to at least some embodiments disclosed herein.

FIGS. 1 and 5 illustrates (m-PSH) system 100A (FIGS. 1 and 5) and 100B-100D (FIG. 5). Referring again to FIG. 1, (m-PSH) system 100A has shaft 102. Shaft 102 may comprise any hollow shape including, but not limited to, cylindrical. Shaft 102 has first end 104 located opposite the second end 106. At least a portion of the second end 106 of shaft 102 being located under the surface of ground 108. It is within the scope of this invention for (m-PSH) system 100A to be configured for storing electric energy in the form of gravity energy.

Figure 2:
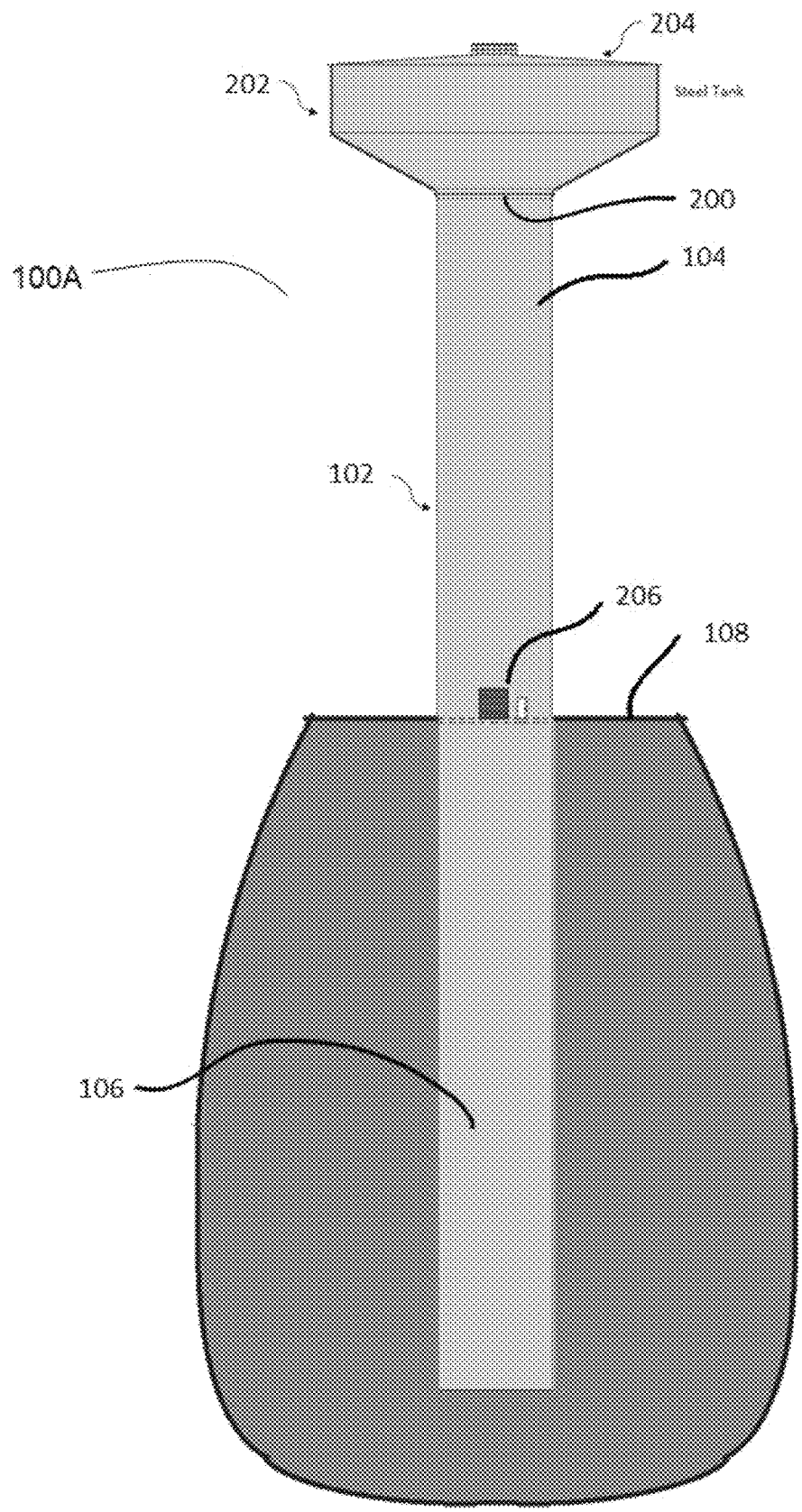
FIG. 2 is an illustration of a side cut-away view of the (m-PSH) system with an in situ concrete foundation forming the lower tank and a water tank at the top of a tower, according to at least some embodiments disclosed herein.

FIG. 2 illustrates (m-PSH) system 100A having first end 104 of shaft 102 having cover 200. Reservoir 202 is connected to first end 104 of shaft 102. Reservoir 202 is configured to retain water or a water mixture or another fluid (not shown). Reservoir 202 may have cover 204. At least a portion of second end 106 of shaft 102 is configured to be located under surface of ground 108. It is within the scope of this invention for the steel, reinforced steel, mass timber and/or composite steel and concrete reservoir 202 and cover 204 to be fabricated at the top of the tower or fabricated at ground level and raised to the final location. Shaft 102 would include at least one opening 206 for ground level access for equipment and personnel installation allowing all operational facilities and controls to be within a sheltered environment.

Figure 2A:
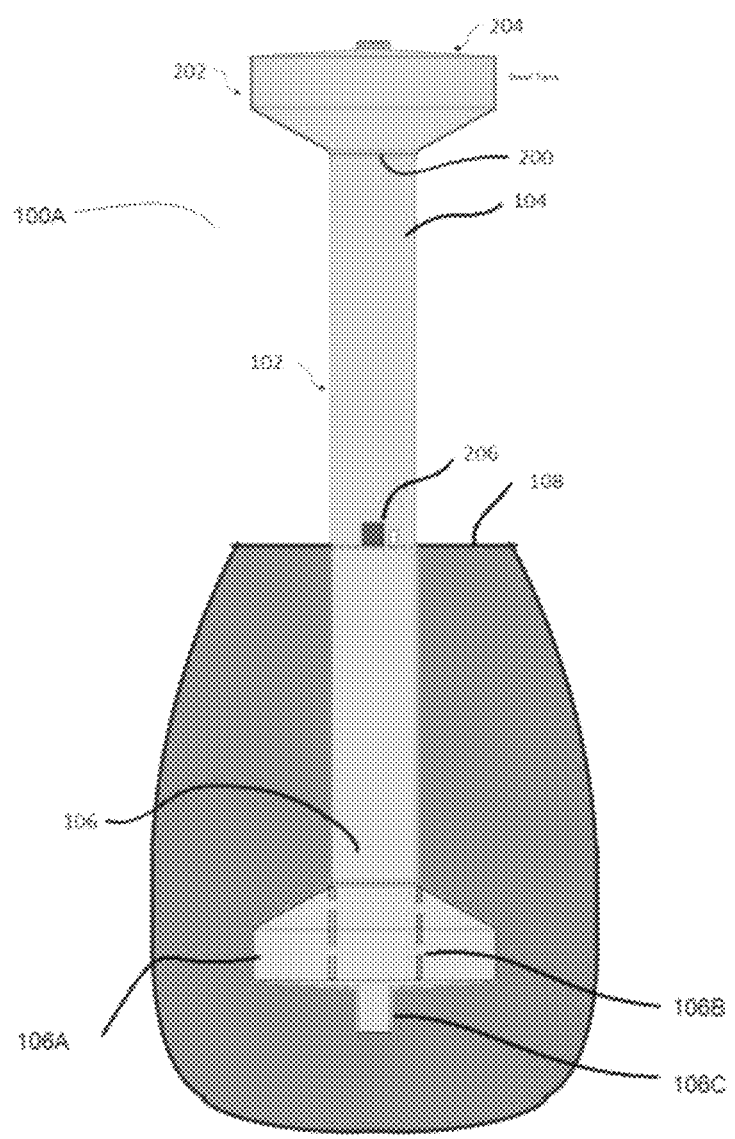
FIG. 2A is an illustration of a side cut-away view of the (m-PSH) system with an in situ concrete foundation incorporating a belled out base forming the lower tank and a water tank at the top of a tower, according to at least some embodiments disclosed herein.

FIG. 2A illustrates an alternate arrangement of the lower shaft 106 that is configured to store a greater proportion of the working fluid at a lower elevation 106A. The lower store is a void space excavated in the ground and may be self-supporting due to the inherent structural capacity of weak to strong soil or rock at that depth. The weight of the lower store walls and the above ground structure may be supported by cylindrical walls 106B and the lower store may include a shaft extension 106C below the expanded base to drain the lower chamber and for more efficient pumping operations.

Figure 3:
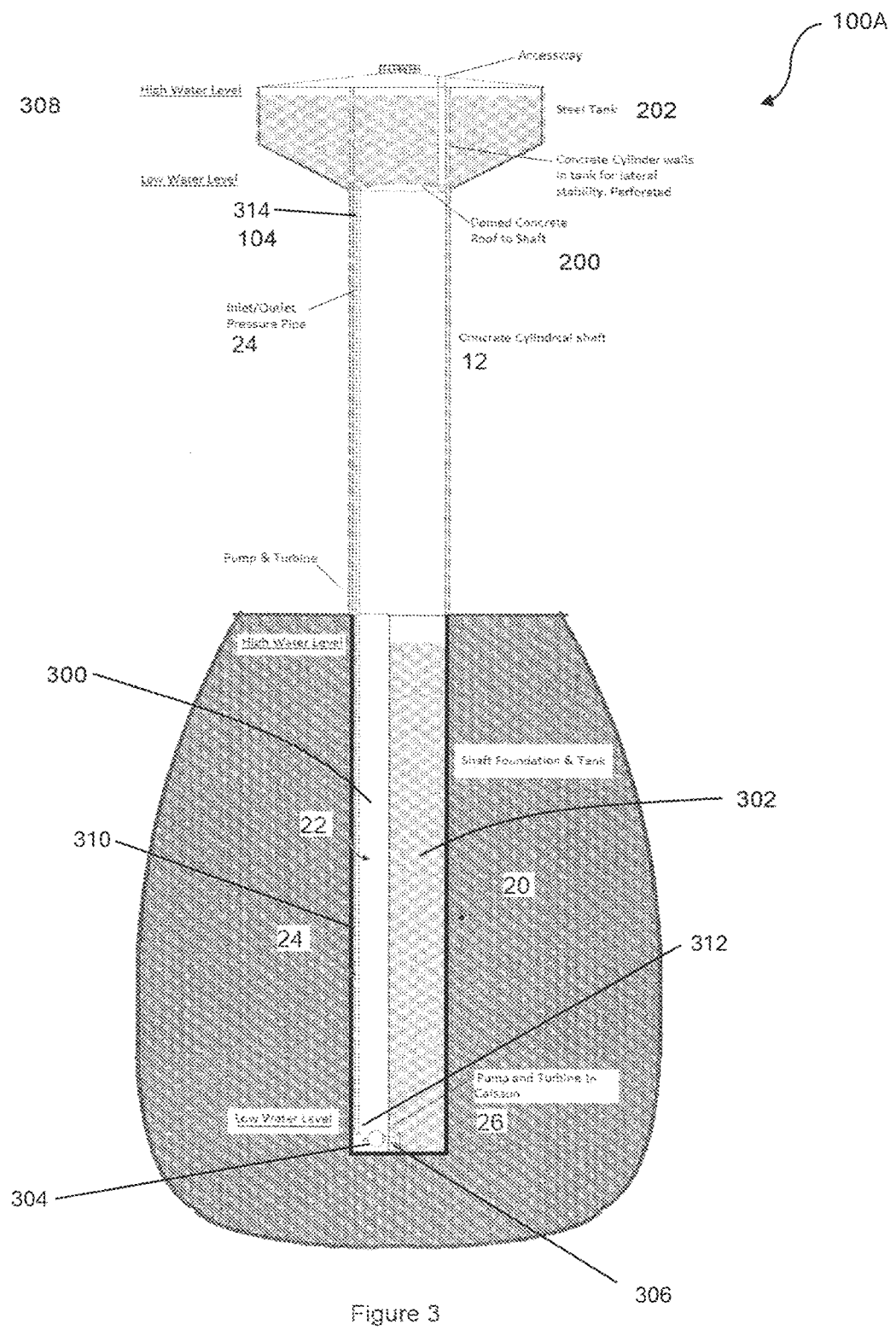
FIG. 3 is an illustration of a side cut-away view of an embodiment of the (m-PSH) system having a lower water storage chamber with dry well or caisson and low elevation pumps and the upper tank sectional view, according to at least some embodiments disclosed herein.

FIG. 3 depicts (m-PSH) system 100A having second end 106 of shaft 102 having first compartment 300 and second compartment 302. First compartment 300 retains at least one pump assembly 304A. Pump assembly 304 has inlet 306 in hydro communication with second compartment 302. Second compartment is configured to retain water 308. At least one pipe 310 has first end 312 connected to pump assembly 304 located opposite second end 314 extending through cover 200 of first end 104 of shaft 102. Cover 200 may be radiused and configured to cover first end 104 of shaft 102 so that water 308 from reservoir 202 does not enter into first end 104 of shaft 102. At least a portion of second end 314 of at least one pipe 310 is in hydro communication with water 308 retained in reservoir 202. At least one pipe 310 of pump assembly 304 is configured to transfer water 308 from second compartment 302 of second end 106 of shaft 102 to reservoir 202. Reservoir 202 has support structure 316 extending from at least a portion of an inner wall surface from a bottom of the reservoir to a top of the reservoir. It is within the scope of this invention for support structure 316 to include, but not be limited to, a continuation of the cylindrical walls of shaft 102 through reservoir 202. Support structure 316 has at least one opening and/or a plurality of openings 318 to facilitate water flow throughout reservoir 202.

FIG. 3 shows an arrangement of a lower storage tank and dry well. The dry well contains the pipework that transmits the stored water from bottom storage tank to upper storage tank or vice-versa. Lifting water is affected by the operation of the pump at the base of the shaft. Lowering water is affected by the gravity forced flow of water from the upper tank to the lower with the pump operating in reverse as a turbine. The underground tank wall provides support of the excavation and also provides structural support to the tower by means of ground friction and lateral restraint on the outside of the tank wall. The dual purpose of tank lining and structural support provides for greater efficiency of materials. The dry well is configured with vertical and lateral structural capacity to resist its own self weight supported either on the base of the underground tank or on intermediate support and to resist hydrostatic forces from the water stored in the lower tank, when present.

The underground facility includes a deep excavation that is preferably cylindrical that supports a concrete or steel or composite concrete-steel tower. The steel tower supports a steel or concrete or composite steel-concrete water storage tank. The underground cylinder may be constructed up to 350 meters deep and 50 meters in diameter to suit the desired power storage capacity. The above ground tower and storage tank may be constructed with a maximum elevation above ground surface of 350 meters and 50 meters diameter to suit the desired storage capacity. A roof covers the water tank to add structural integrity to the storage tank and to reduce evaporation losses from the storage tank.

Figure 3A:
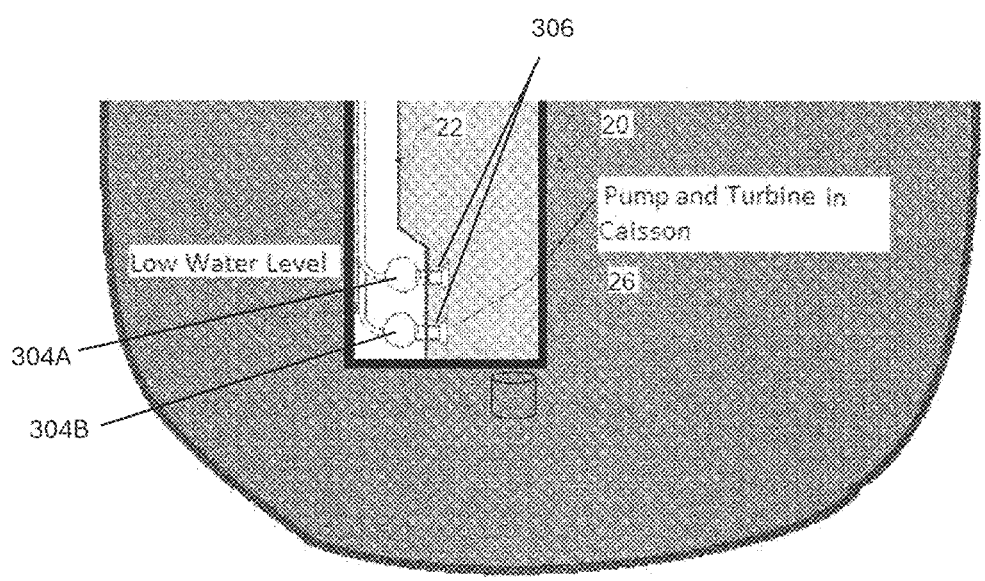
FIG. 3A is an illustration of a sectional side cut-away view of an embodiment of the (m-PSH) system of FIG. 3 in which the lower storage tank indicating the stacking of the low-level pumps within a dry well and the dry well having a reduced diameter above the pump bay, according to at least some embodiments disclosed herein.

FIG. 3A shows an embodiment of (m-PSH) system 100A having at least a portion of first compartment 300 of second end 106 of shaft 102 is tapered 318 to a reduced diameter to limit its incursion into the lower water tank storage space. For example, second compartment 302 is capable of retaining a larger volume of water 308 when first compartment 300 has at least a portion of at least one wall surface having a tapered configuration. It is within the scope of this invention for first compartment 300 or retain plurality of pump assemblies 304A and 304B in a stacked configuration.

Figure 4:
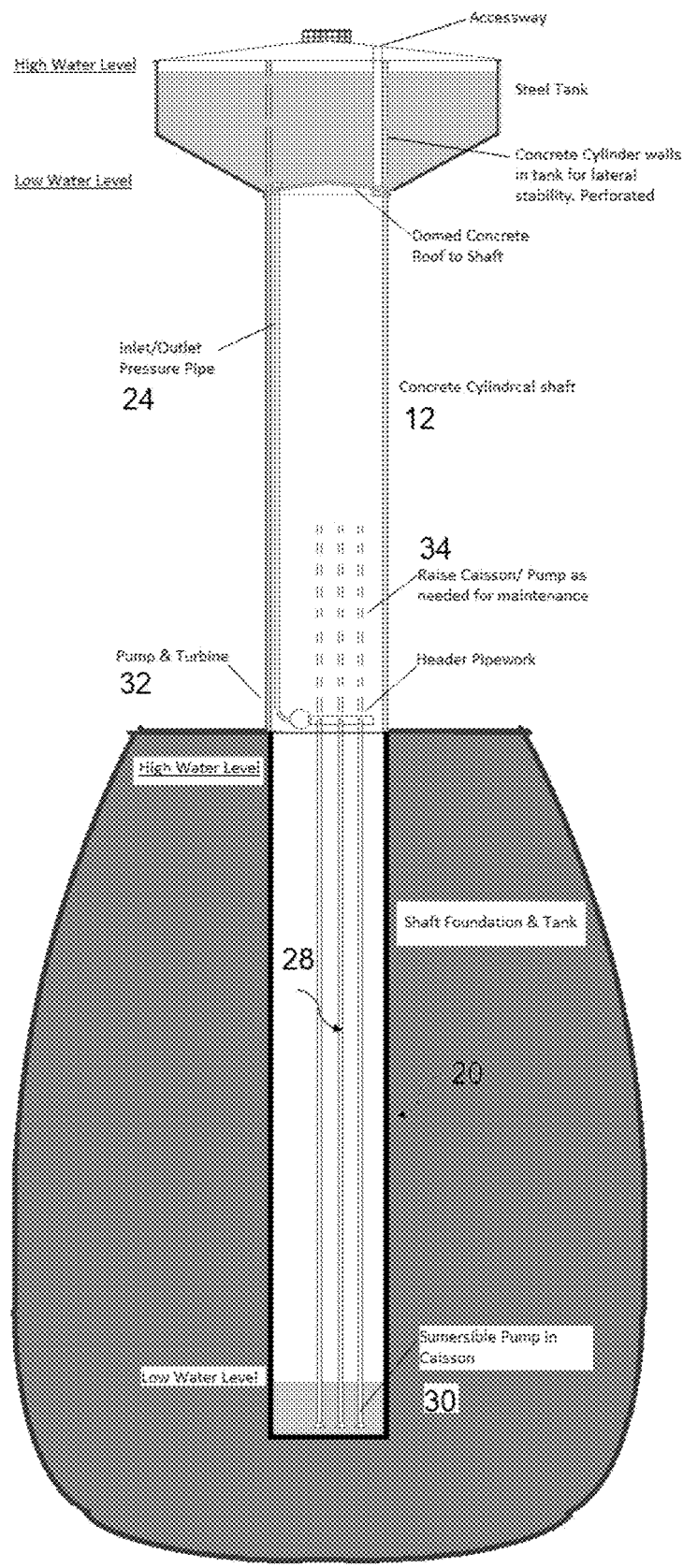
FIG. 4 is an illustration of a side cut-away view of an embodiment of the (m-PSH) system having the lower water storage chamber with submersible pumps in separate caissons and an upper tank, according to at least some embodiments disclosed herein.

FIG. 4 shows an alternate embodiment of (m-PSH) system 400 having shaft having first end 104 located opposite the second end 106. First end 104 of shaft 102 having cover 200. Reservoir 202 is connected to first end 104 of shaft 102. Reservoir 202 is configured to retain water 308. At least a portion of second end 106 of shaft 102 is configured to be located under a surface of ground 108. Second end 106 of shaft 102 having compartment 406 configured to retain water 308. At least one pump assembly 304A is retained within first end 104 of shaft 102. Pump assembly 304A is connected to at least one protruding structure 402, such as a pipe and/or a tube, having inlet 404 in hydro communication with compartment 406. At least one pipe 310 has first end 312 connected to the pump assembly located opposite second end 314 extending through cover 200 of first end 104 of shaft 102. At least a portion of second end 314 of at least one pipe 310 is in hydro communication with reservoir 202. At least one pipe 310 of pump assembly 304 is configured to transfer water 308 from compartment 406 of second 106 end of shaft 102 to reservoir 202. Pump assembly 304A is adjustable and configured to traverse at least a portion of a length of shaft 102.

FIG. 4 shows the (m-PSH) system 400 having an arrangement of a lower storage tank but with steel pipe caissons extending from ground level to close to the bottom of the underground tank. Submersible pumps are positioned in the caissons by lowering from the ground surface. Due to limitations of current submersible pump technology, a separate pump is provided at ground level to lift the stored water from the lower tank to the upper tank. Pumps and caissons are able to be raised for maintenance as needed within the internal volume of the above ground tower.

Figure 4A:
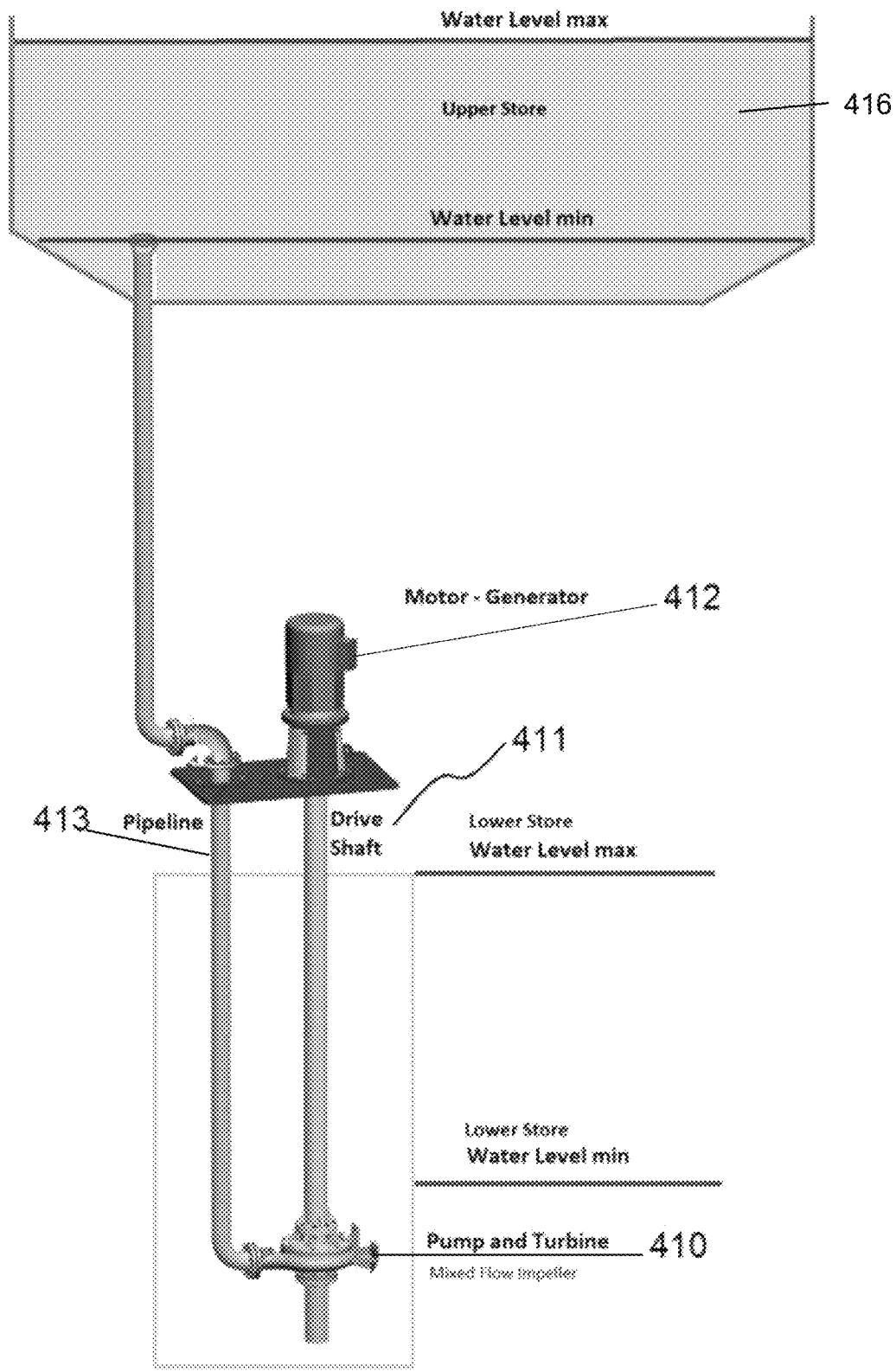
FIG. 4A is an illustration of a side cut-away view of an embodiment of the (m-PSH) system having the lower water storage chamber with submerged pump submerged in the lower water storage chamber with a drive shaft connected to a surface mounted motor-generator and a parallel pipeline to surface and to the upper store and an upper tank, according to at least some embodiments disclosed herein.

FIG. 4A shows an alternate arrangement of pump with a combined pump and turbine (often summarized as a PAT) 410 that is positioned at optimal depth in the lower store with a vertical pump axis connected to a vertical drive shaft 411. The drive shaft is rotated by the motor 412 in pumping mode or by the PAT 410 in discharge mode thus driving the generator 412. The pipeline 413 is orientated in parallel to the drive shaft 411 transporting fluid from the PAT 410 to the upper store 416.

Figure 4B:
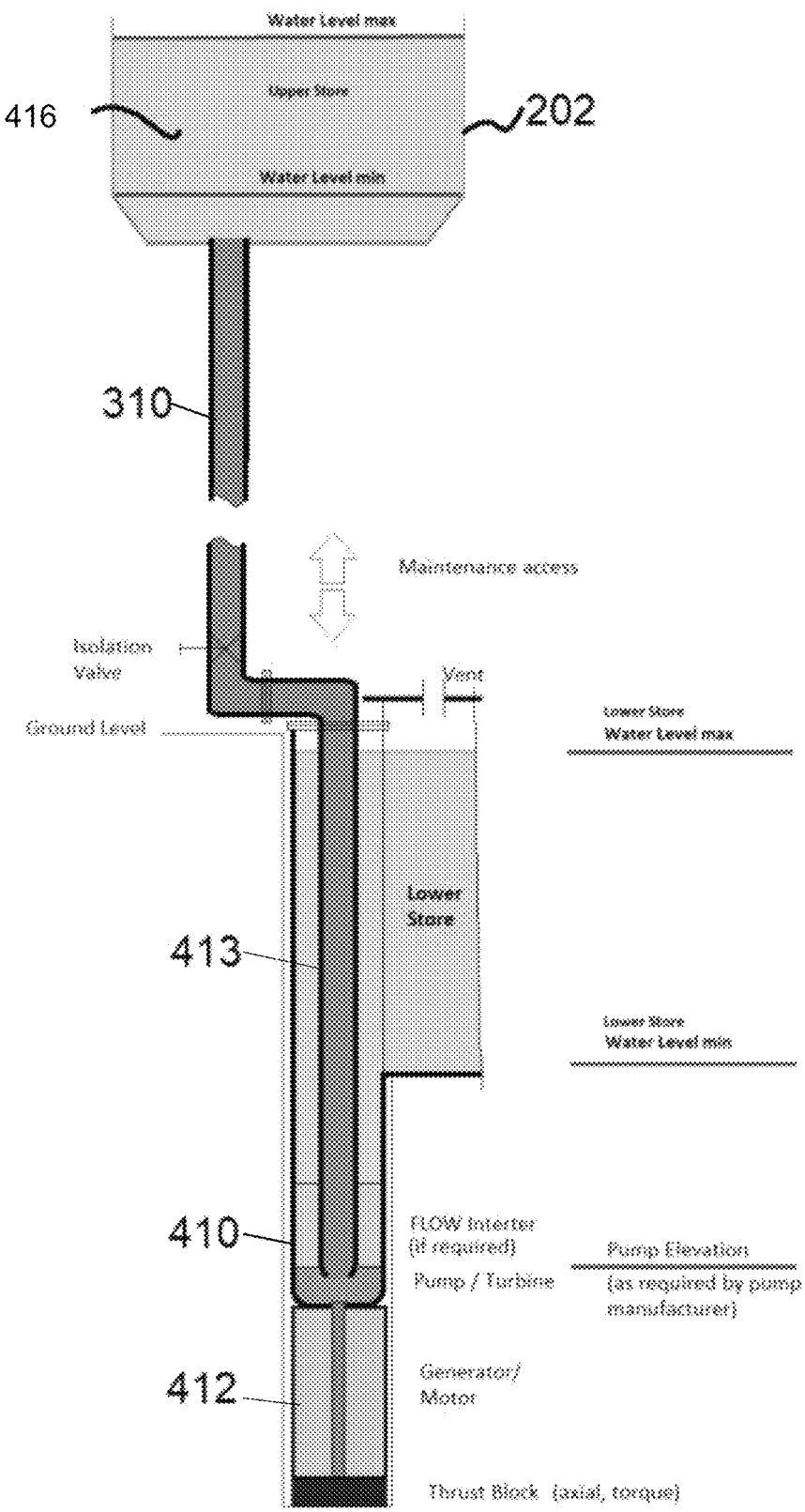
FIG. 4B is an illustration of a side cut-away view of an embodiment of the (m-PSH) system having the lower water storage chamber with submerged pump submerged in the lower water storage chamber with a drive shaft connected to a submersible mounted motor-generator and deep borehole connected to the lower store and with the motor-generator also submerged in the borehole and connected to a concentric vertical pipeline to surface and to the upper store and an upper tank, according to at least some embodiments disclosed herein.

FIG. 4B shows an alternate arrangement of PAT and pipeline. The PAT 410 is submerged at some elevation below the lower store minimum to achieve a minimum required overpressure for pump operations and is powered by a motor-generator 412 below the PAT 410. The pipeline to ground is concentrically located with the PAT and is connected to the upper pipeline 310 to the upper store 416.

Figure 4C:
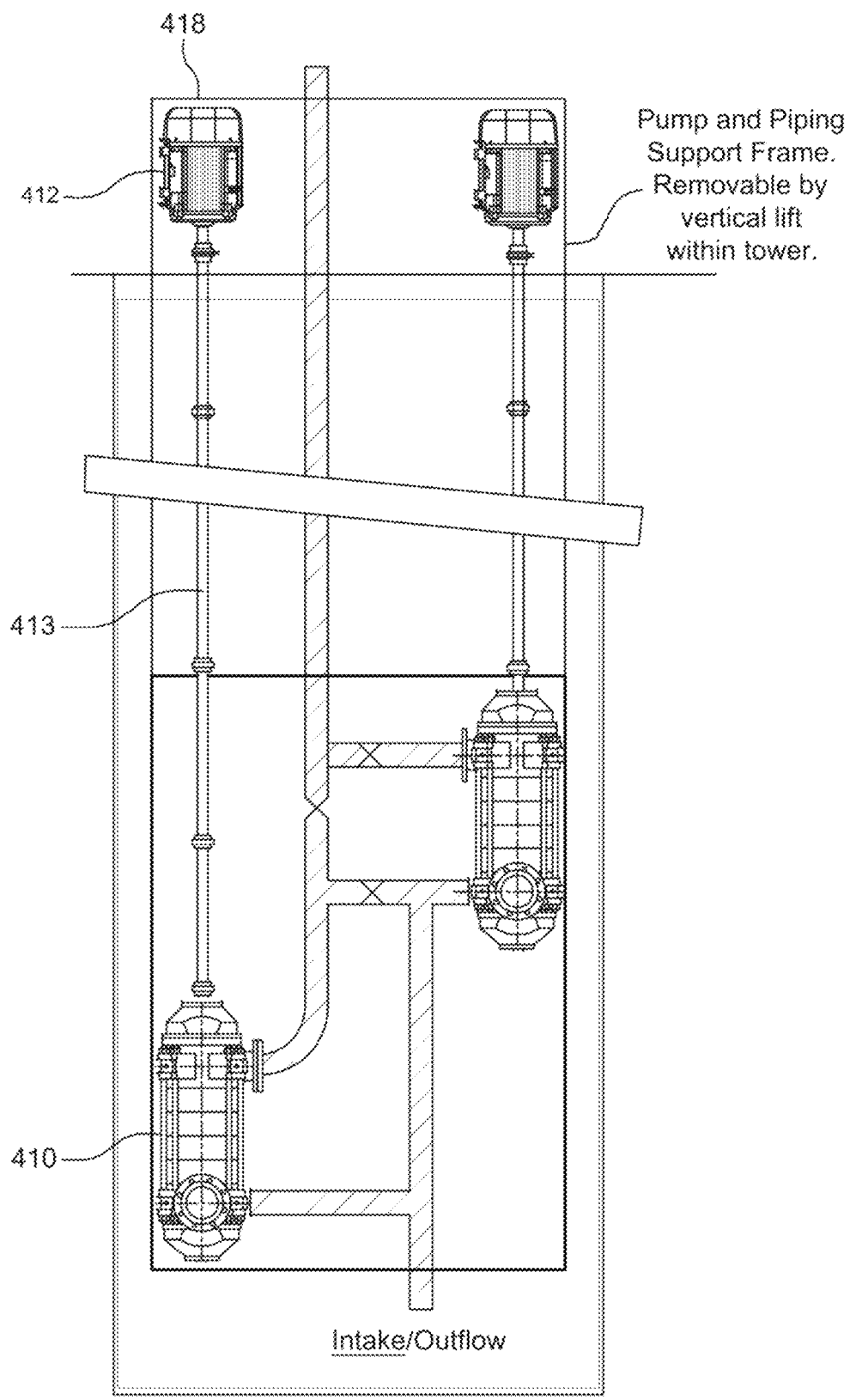
FIG. 4C is an illustration of a front cut-away view of an embodiment of the (m-PSH) system having the lower water storage chamber with multiple submerged pumps submerged in a configuration of pipes and valves supported in a retractable structure in the lower water storage chamber with drive shafts connected to a surface mounted motor-generator and a parallel pipeline to surface and to the upper store and an upper tank, according to at least some embodiments disclosed herein.
Figure 4D:
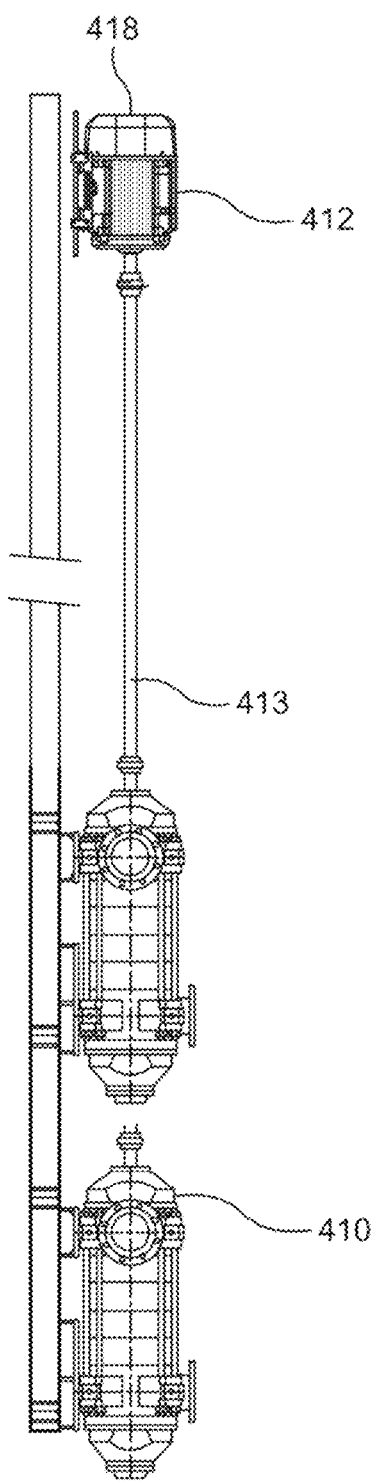
FIG. 4D is an illustration of a right side cut-away view of the (m-PSH) system of FIG. 4C, according to at least some embodiments disclosed herein.

FIGS. 4C, 4D, and 4E show a further alternate arrangement of system 418 with a PAT 410, a motor-generator 412, and pipelines 413. The PAT 410 are submerged in the lower store and are connected with pipes 413 and valves to enable fluid flow to either be directed through each PAT in turn, split 50/50 to each PAT or to allow only one PAT to operate with the benefit that a wide range of fluid flow rates can be effected at near-optimum efficiencies for a range of operating pressures. The PAT, pipes and motor-turbines are mounted on a vertical framework that is able to be raised for maintenance without personnel having to venture into the lower store.

FIG. 4F is an illustration of an example circuit diagram 420 of a Single-Serial-Parallel (SSP) pump regulation. In implementations, a Single-Serial-Parallel (SSP) pump regulation system involving two pumps functioning as turbines (PATs), labeled PAT A 422 and PAT B 423, along with three valves, the fluid regulation and flow paths are configured to be controlled. The system starts at the inlet, where the fluid enters and encounters Valve 1 421. This valve regulates the flow into PAT A 422, which then processes the fluid.

Following this, the fluid passes through Valve 2 424, which controls the flow between PAT A 422 and PAT B 423. After the fluid is processed by PAT B 423, it flows through Valve 3 426, which manages the final outflow before the fluid exits the system at the outlet. The system can operate in multiple modes depending on the valve positions. In serial mode (not shown), all valves are open, allowing the fluid to flow sequentially through PAT A and then PAT B. In a parallel mode (not shown), if additional bypass paths are present, Valve 1 remains open or controlled, Valve 2 is closed, and Valve 3 is open or controlled, enabling the fluid to bypass PAT A and flow directly into PAT B, or flow in parallel through a separate path. In single pump mode (not shown), only PAT A is in operation with Valve 1 open, Valve 2 closed, and Valve 3 open, directing the fluid from PAT A directly to the outlet. In isolated operation (not shown), Valve 1 is closed while Valves 2 and 3 are open or controlled, allowing PAT B to operate independently of PAT A. This configuration provides flexibility, enabling optimization of the system's performance under varying conditions and requirements.

FIG. 5 illustrates (m-PSH) system 100A-100D having a possible arrangement of multiple pumped water tower energy storage facilities to meet desired capacity at a site. The arrangement of multiple facilities on a regular pattern provides for the sharing of construction, operations and maintenance equipment helping to deliver lower unit storage costs. The spacing of underground facilities is at least three times the excavated diameter of the lower storage tank structure, a conventional approach for foundation configurations. The tower spacing would also consider the potential interaction of above ground facilities when subject to wind load, so would not be less than two times the upper tank outside diameter.

Figure 6:
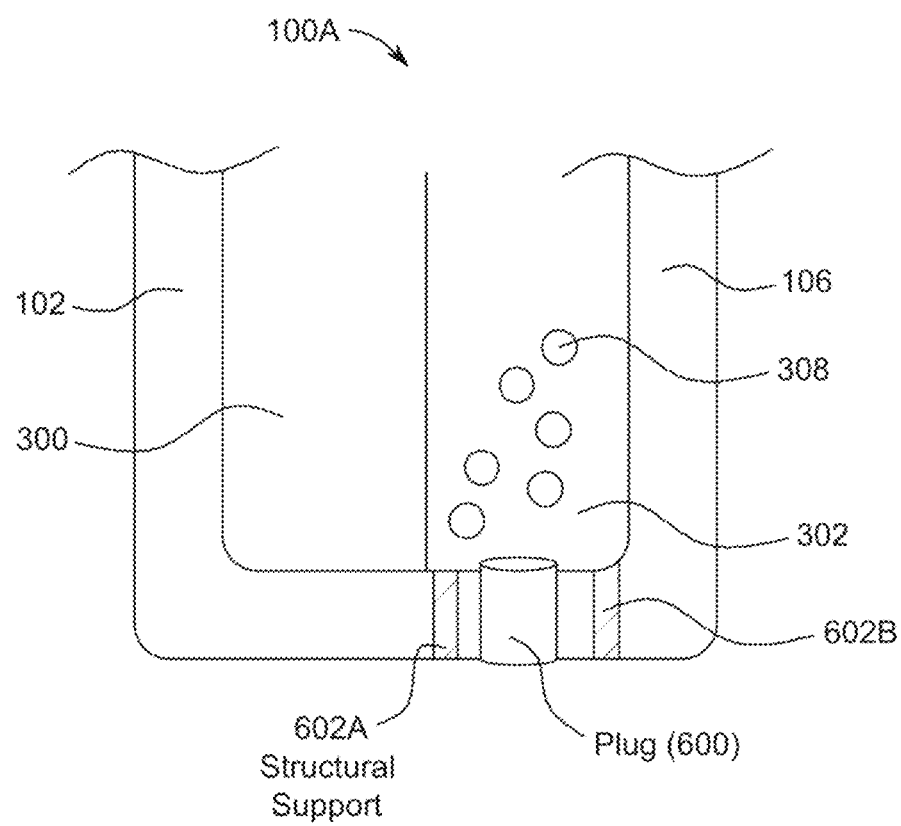
FIG. 6 is an illustration of a partial cut-away view of an embodiment of the (m-PSH) system with a second compartment of the shaft having a plug disposed at the bottom and beneath an inside of the cylindrical facility and having a structural support component disposed between an outside of the cylindrical facility and the plug, according to at least some embodiments disclosed herein.

FIG. 6 shows an embodiment of (m-PSH) system 100A having second end 106 of shaft 102 with first compartment 300 and second compartment 302 of shaft 102 retaining water 308. Shaft 102 has plug 600 disposed at the bottom and beneath an inside of the shaft 102 of cylindrical facility and having at least one structural support 602A and 602B disposed between an outside of the cylindrical facility and plug 600.

Figure 7:
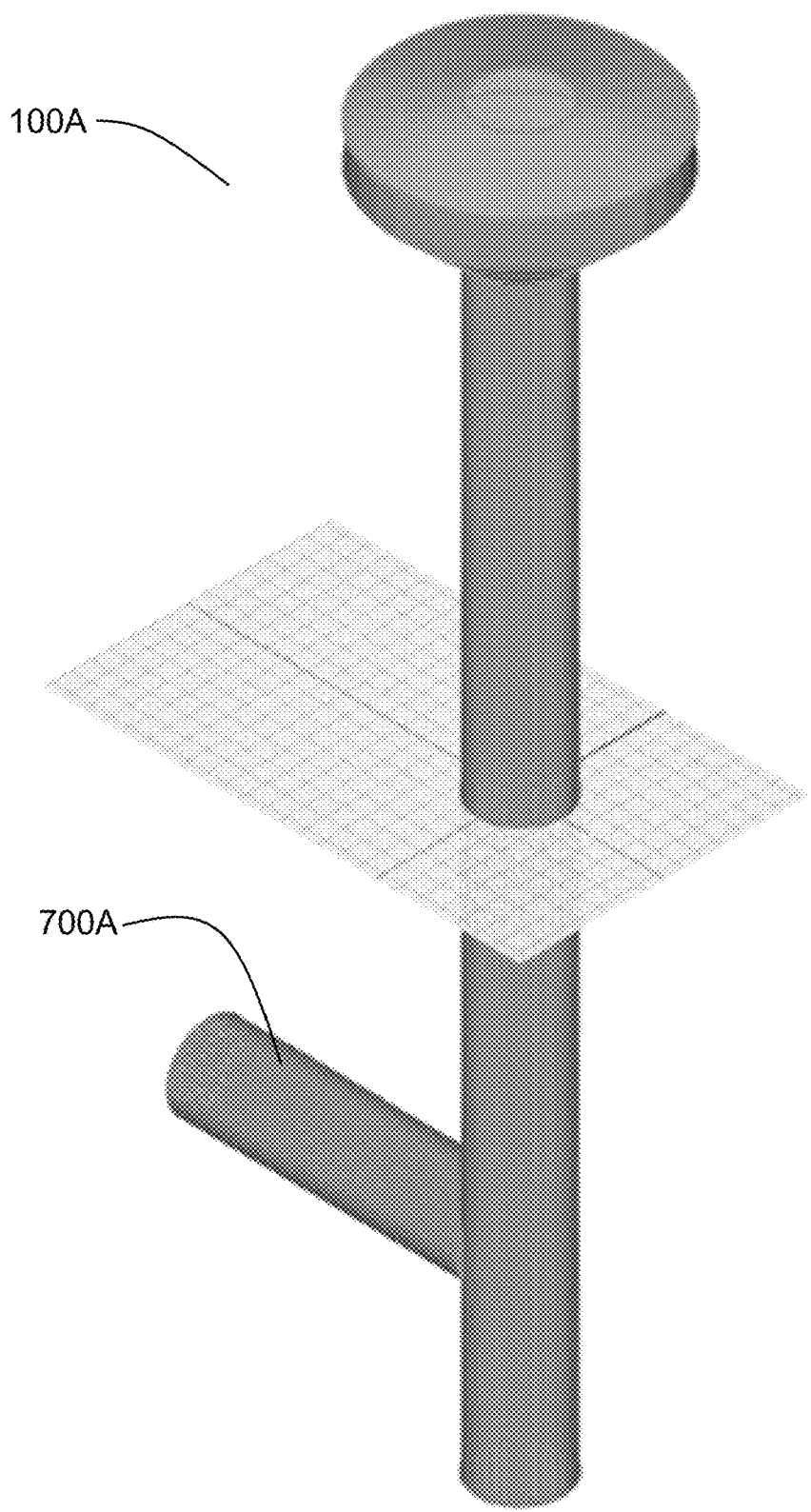
FIG. 7 is an illustration of a perspective view of a (m-PSH) system with a lateral underground compartment for increased storage capacity, according to at least some embodiments disclosed herein.

FIG. 7 shows an embodiment of (m-PSH) system 100A having lateral extension 700A of the underground structure and water storage compartment providing enhanced storage capacity. The lateral compartment may be of new construction or might be an existing facility from a disused mine lateral, an underground bunker or a disused tunnel.

Figure 8:
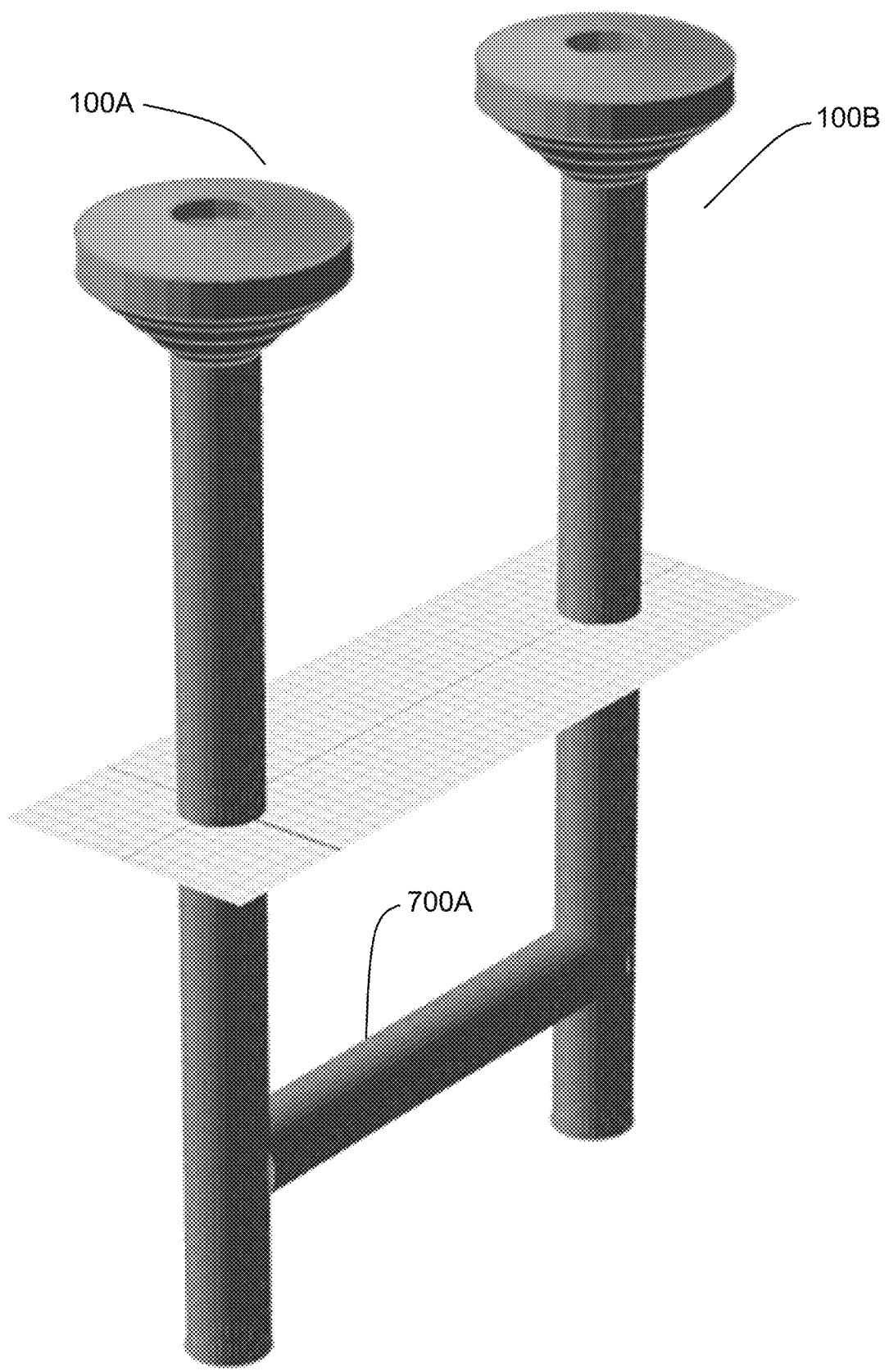
FIG. 8 is an illustration of a perspective view of a dual (m-PSH) system with a connecting lateral underground compartment for increased storage capacity and water reservoir sharing, according to at least some embodiments disclosed herein.

FIG. 8 shows an embodiment of first m-PSH system 100A connected to second m-PSH system 100B with lateral extension 700A. First m-PSH system 100A and second m-PSH system 100B each have above and below ground compartments. The compartments share a linked compartment at lateral extension 700A to provide the same shared storage capacity and contribute to the structural capacity of the total system.

Figure 9:
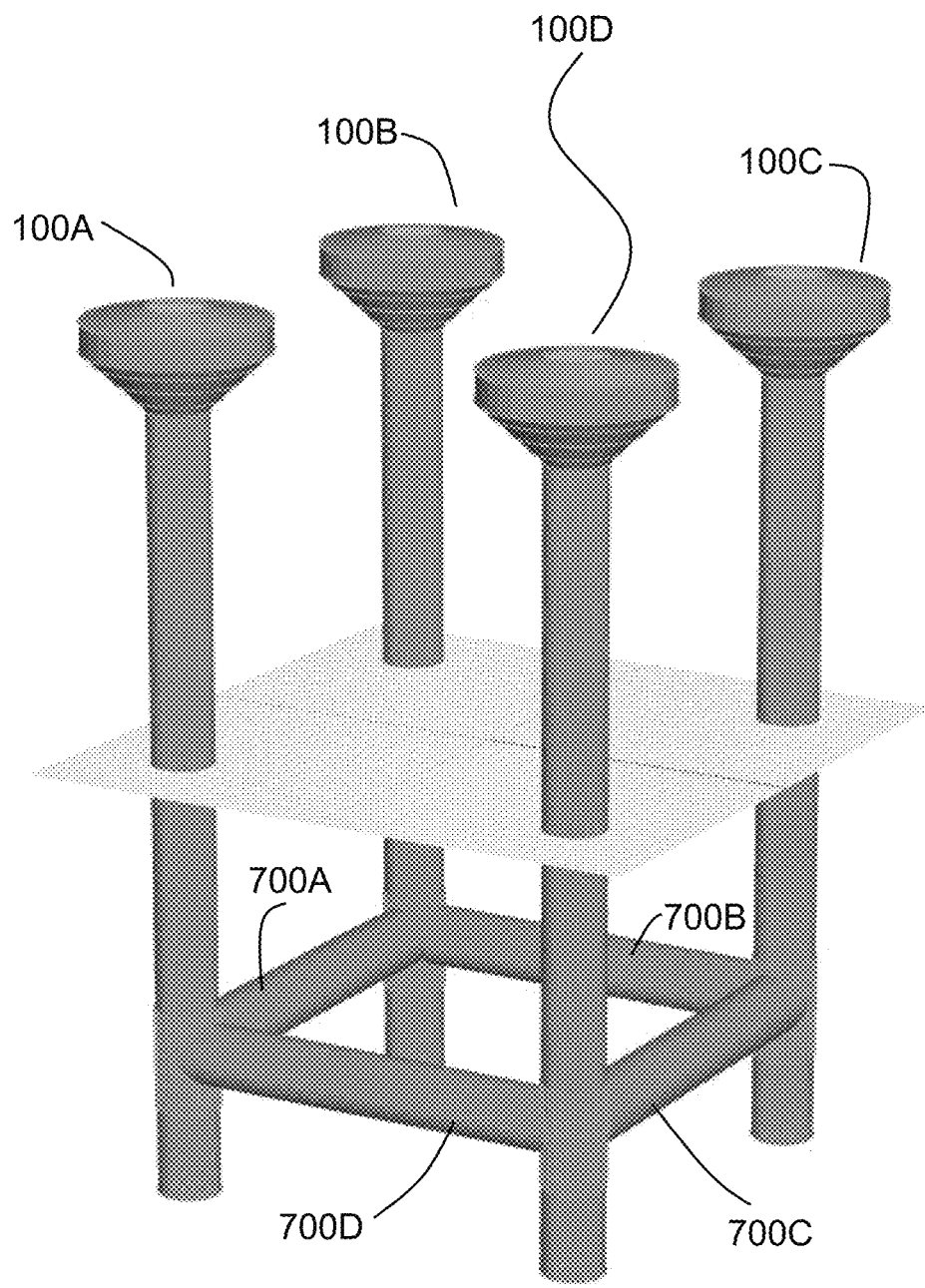
FIG. 9 is an illustration of a perspective view of a quad (m-PSH) system with multiple connecting lateral underground compartments for increased storage capacity, water reservoir sharing and perhaps increased foundation stability, according to at least some embodiments disclosed herein.
Figure 10:
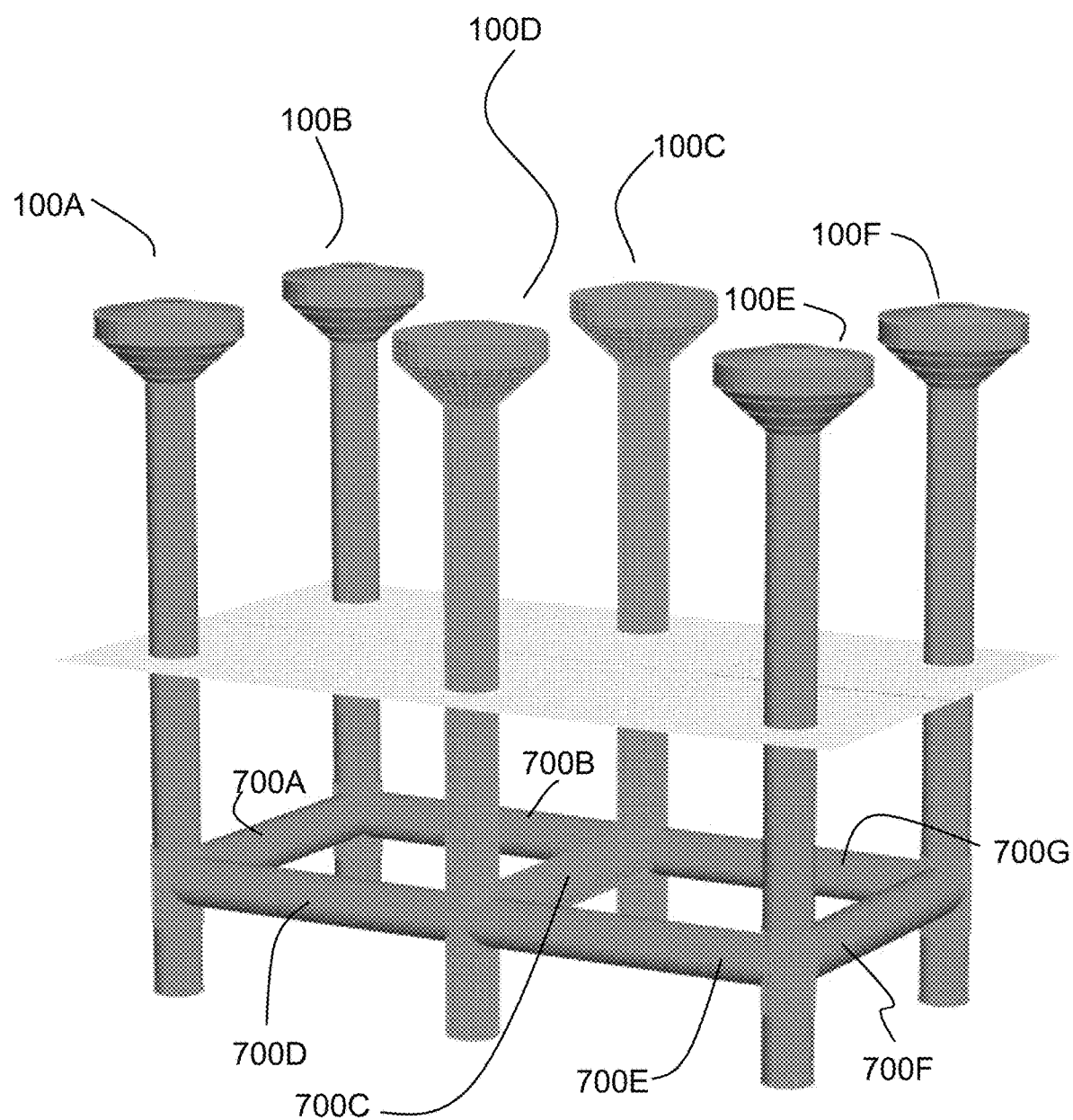
FIG. 10 is an illustration of a perspective view of a six (m-PSH) system with multiple connecting lateral underground compartments for increased storage capacity, water reservoir sharing and perhaps increased foundation stability, according to at least some embodiments disclosed herein.

FIGS. 9-10 show an embodiment of first m-PSH system 100A connected to second m-PSH system 100B with lateral extension 700A. Second m-PSH system 100B is connected to third m-PSH system 100C with lateral extension 700B. Third m-PSH system 100C is connected to forth m-PSH system 100D with lateral extension 700C. Forth m-PSH system 100D is connected to first m-PSH system 100A with lateral extension 700D. Referring now to FIG. 10, Forth m-PSH system 100D is connected to fifth m-PSH system 100E with lateral extension 700E. Fifth m-PSH system 100E is connected to sixth m-PSH system 100F with lateral extension 700F. Sixth m-PSH system 100F is connected to third m-PSH system 100C with lateral extension 700G. The above and below ground compartments share a linked compartment to provide the same shared storage capacity and contribute to the structural capacity of the total system.

Figure 11:
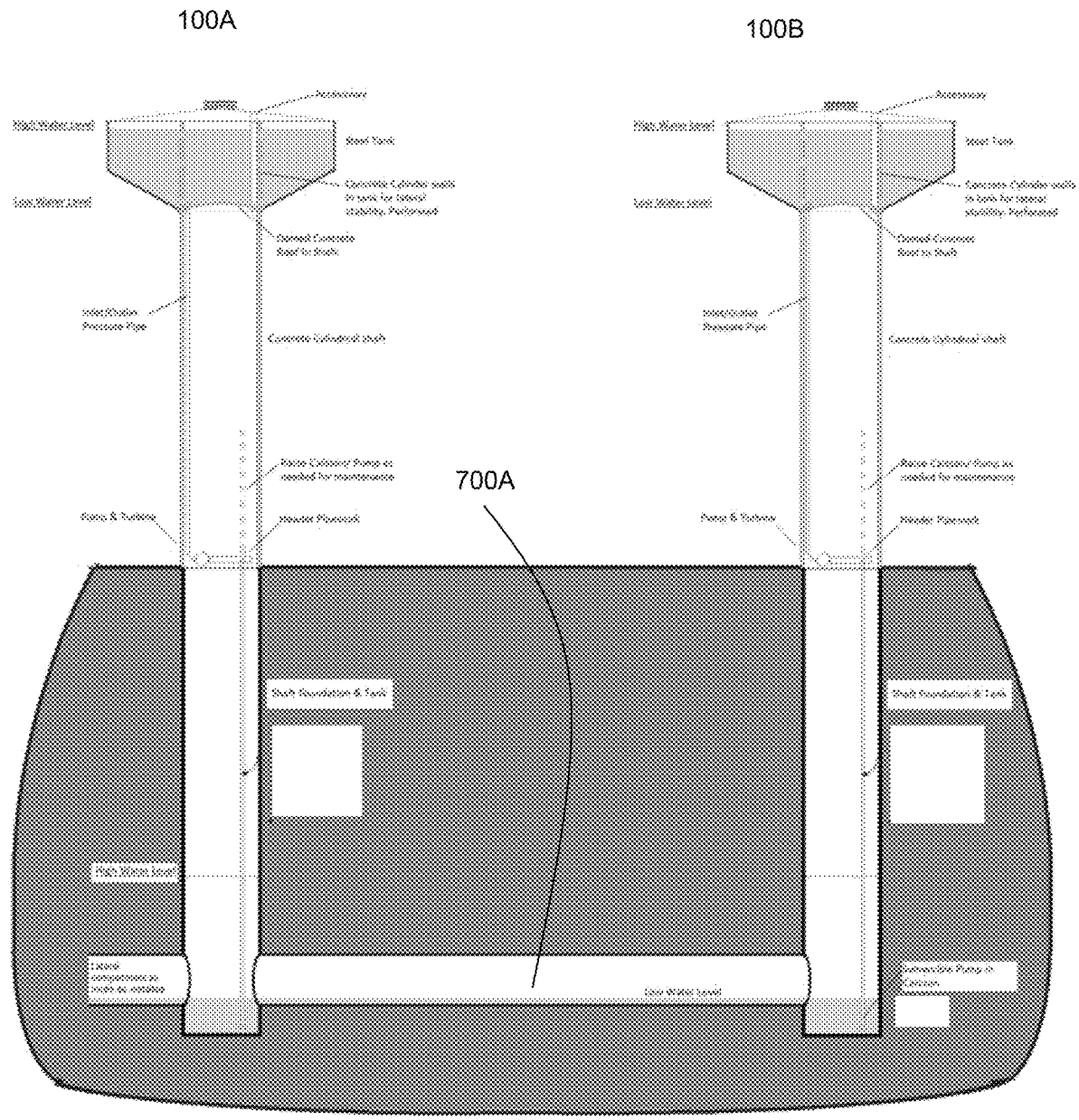
FIG. 11 is an illustration of a side cut-away view of an embodiment of the dual, quad or six (m-PSH) system having a lower water storage chamber with dry well or caisson and low elevation pumps and the upper tank sectional view, according to at least some embodiments disclosed herein.

FIG. 11 illustrates (m-PSH) system 100A and 100B having a possible arrangement of multiple pumped water tower energy storage facilities to meet desired capacity at a site as described above. One or more lateral connector pipes 700A join the underground compartments for the benefit of sharing the water reservoir and reducing the required depth of underground shaft excavation.

Figure 12:
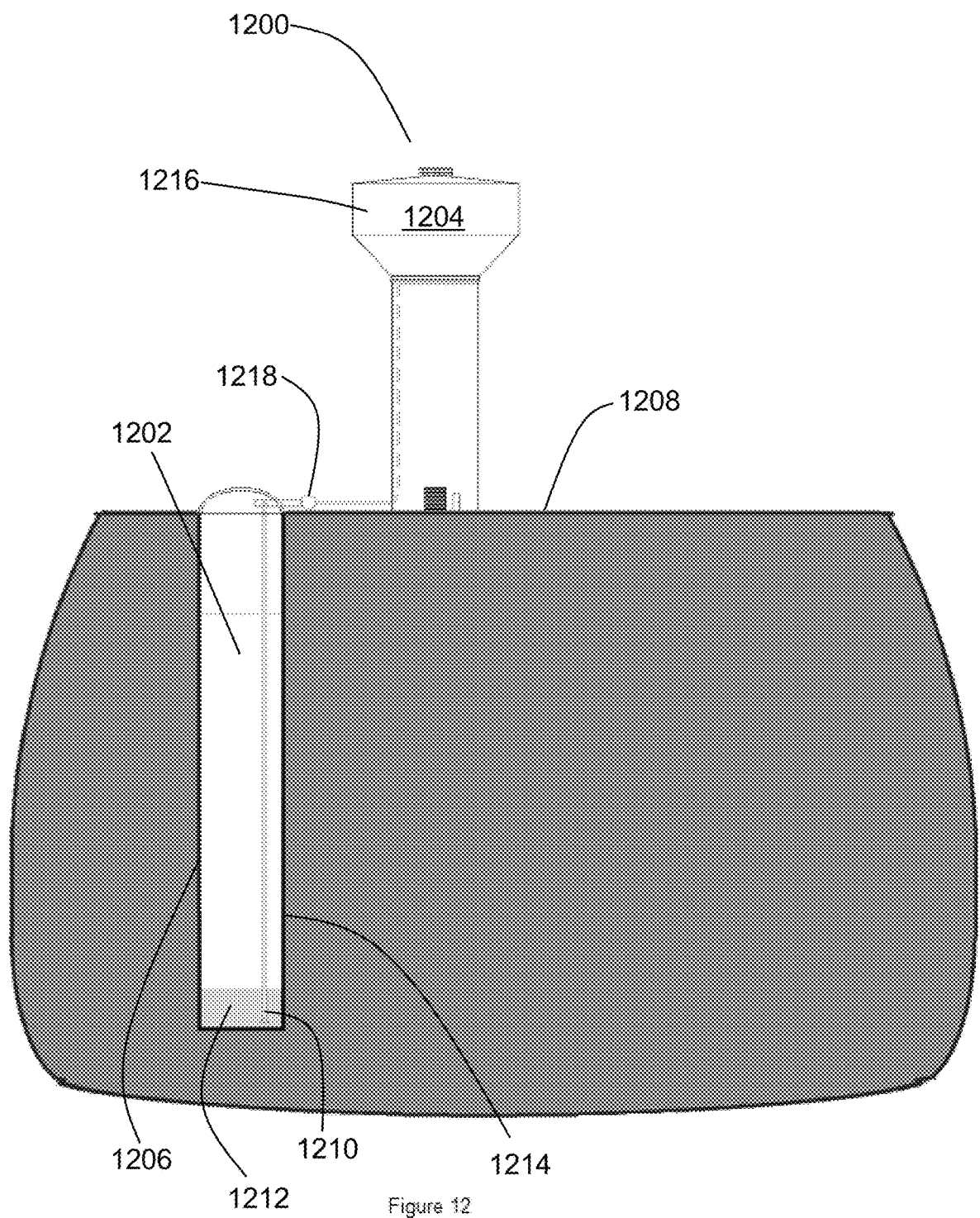
FIG. 12 is an illustration of a side cut-away view of an embodiment of the (m-PSH) system having a lower water storage chamber separated laterally from a water tank and tower with dry well or caisson and low elevation pump(s)

FIG. 12. shows an embodiment of (m-PSH) system 1200 with underground compartment 1202 with an offset laterally positioned from the location of water tower 1204. The general arrangement provides possible benefits by providing an additional useful function of existing water tanks to be incorporated into a m-PSH. Steel pipe caissons 1206 extending from ground level 1208 to close to the bottom of the underground tank. Submersible pumps 1210 are positioned in the caissons 1206 by lowering from ground surface 1208. Due to limitations of current submersible pump technology, a separate pump 1218 is provided at ground level 1208 to lift stored water 1212 from lower tank 1214 to upper tank 1216. Pumps and caissons are able to be raised for maintenance as needed within the internal volume of the above ground tower.

FIG. 13. shows an embodiment of (m-PSH) system with the underground compartment 1202 that may have an offset laterally positioned from the location of a water tower or may be positioned directly under a water tower. Submersible pumps are positioned in the caissons by lowering from the ground surface. The submersible pumps are lowered into a reduced width of the compartment, commonly known as a sump 1216, so as to reduce required excavation of the underground compartment. The lower compartment may have lateral connector 700A or may not have lateral connectors between the lower compartments according to the embodiments described above.

FIG. 14 shows an embodiment of (m-PSH) system 1400 with an alternate arrangement of the lower shaft 106 that is configured to store a greater proportion of the working fluid at a lower elevation 106A as described above. The lower shaft 106 connects the lower store 106A which has a reduced diameter for reduced excavation effort. The upper shaft 502 may be configured to the optimum diameter to support the upper store 416 and may be supported on separate shallow or deep foundations 501. The upper shaft 502 may be constructed of steel, concrete or timber as may be the most constructable and sustainable use of materials for least carbon footprint. The pumping operations within the tower may be effected by any arrangement of pump, PAT and motor-generators as described herein.

In some aspects, the techniques described herein relate to a modular pumped storage hydropower system, including: a shaft having a first end located opposite a second end, the first end of the shaft having a cover; a reservoir is connected to the first end of the shaft, the reservoir is configured to retain water; at least a portion of the second end of the shaft is configured to be located under a surface of ground, the second end of the shaft having a first compartment and a second compartment, the first compartment retaining a pump assembly, the pump assembly having an inlet in hydro communication with the second compartment, the second compartment is configured to retain the water; and at least one pipe, the at least one pipe having a first end connected to the pump assembly located opposite a second end extending through the cover of the first end of the shaft, at least a portion of the second end of the at least one pipe is in hydro communication with the reservoir, the at least one pipe of the pump assembly is configured to transfer the water from the second compartment of the second end of the shaft to the reservoir.

In some aspects, the techniques described herein relate to a system, further including the reservoir having a support structure extending from at least a portion of an inner wall surface from a bottom of the reservoir to a top of the reservoir.

In some aspects, the techniques described herein relate to a system, further including the support structure having a plurality of openings.

In some aspects, the techniques described herein relate to a system, further including a radiused cover, the cover is radiused covering the first end of the shaft.

In some aspects, the techniques described herein relate to a system, wherein at least a portion of the first compartment of the second end of the shaft is tapered.

In some aspects, the techniques described herein relate to a modular pumped storage hydropower system, including: a shaft having a first end located opposite a second end, the first end of the shaft having a cover; a reservoir is connected to the first end of the shaft, the reservoir is configured to retain water; at least a portion of the second end of the shaft is configured to be located under a surface of ground, the second end of the shaft having a compartment configured to retain the water; a pump assembly, the pump assembly retained within the first end of the shaft, the pump assembly having an inlet in hydro communication with the compartment; and at least one pipe, the at least one pipe having a first end connected to the pump assembly located opposite a second end extending through the cover of the first end of the shaft, at least a portion of the second end of the at least one pipe is in hydro communication with the reservoir, the at least one pipe of the pump assembly is configured to transfer the water from the compartment of the second end of the shaft to the reservoir.

In some aspects, the techniques described herein relate to a system, further including the reservoir having a support structure extending from at least a portion of an inner wall surface from a bottom of the reservoir to a top of the reservoir.

In some aspects, the techniques described herein relate to a system, further including the support structure having a plurality of openings.

In some aspects, the techniques described herein relate to a system, further including a radiused cover, the cover is radiused covering the first end of the shaft.

In some aspects, the techniques described herein relate to a system, wherein the pump assembly is adjustable, wherein the pump assembly is configured to traverse at least a portion of a length of the shaft.

In some aspects, the techniques described herein relate to a system adapted for storing electric energy in a form of gravity energy, the system including: an excavation disposed beneath a ground surface; a liner surrounding the excavation; a dry well structure that provides an accessway from bottom to top of the excavation; a first of pipe that connects an underground cylindrical storage facility with a pumping facility disposed at the bottom of the excavation, inside the dry well; an alternate arrangement of pipes that connect the underground cylindrical storage facility with the pumping facility disposed at the ground surface, inside the dry well; an arrangement of the pipes that connect the underground piping to an elevated water tank; an above ground tower supporting the water tank; and water lines and electrical power lines disposed above the ground surface and configured to supply water and electrical power to the system.

In some aspects, the techniques described herein relate to a system, wherein the excavation is cylindrical in shape.

In some aspects, the techniques described herein relate to a system, wherein the excavation liner provides support to the cylindrical tower.

In some aspects, the techniques described herein relate to a system, wherein the excavation liner includes a material selected from the group consisting of: steel, reinforced concrete, and composite steel-concrete.

In some aspects, the techniques described herein relate to a system, wherein the excavation liner has sufficient capacity to receive vertical and lateral support to the tower while also supporting the excavation and limiting fluid flow through the liner.

In some aspects, the techniques described herein relate to a system, wherein the underground excavation also forms the underground water storage tank.

In some aspects, the techniques described herein relate to a system, wherein the excavation is as much as 500 meters deep.

In some aspects, the techniques described herein relate to a system, wherein the excavation has a belled out base of up to 100 meters diameter.

In some aspects, the techniques described herein relate to a system, wherein the underground excavation lining is installed after the base is belled out and the lining within the bell forms the vertical support to the lining above.

In some aspects, the techniques described herein relate to a system, wherein the excavation is as much as 50 meters in diameter.

In some aspects, the techniques described herein relate to a system, wherein the arrangement of pipes includes valves and pumps disposed beneath the ground surface in a dry well, and wherein the arrangement of pipes is configured to raise the water from a lower chamber to an upper chamber.

In some aspects, the techniques described herein relate to a system, further including: a plug disposed at the bottom and beneath an inside of the underground cylindrical storage facility, a structural support component disposed between an outside of the cylindrical facility and the plug.

In some aspects, the techniques described herein relate to a system, wherein a quantity of the underground cylindrical storage facility is more than one such that a first underground cylindrical storage facility is separated by a distance from a second underground cylindrical storage facility.

In some aspects, the techniques described herein relate to a system, wherein a subset of vertical pipes are located in the underground tank and contain submersible pumps.

In some aspects, the techniques described herein relate to a system, wherein guides and internal pipes extend to the ground surface, and wherein a plurality of pumps or a turbine are located at the ground surface.

In some aspects, the techniques described herein relate to a system, wherein multiple silos are arranged into a power storage facility with a commonly shared pump/turbine and balance of plant facilities.

In some aspects, the techniques described herein relate to a system, wherein the system further includes: variable pump and turbine operation options to allow a stepped power storage and generation operation of the underground cylindrical storage facility from low to very high-power operations.

In some aspects, the techniques described herein relate to a system, wherein the speed of the pump and turbine system is varied to achieve optimal hydraulic efficiency by adjustment of the drive shaft speed using either a variable ratio gearbox or a variable speed drive motor.

In some aspects, the techniques described herein relate to a system, wherein the system further includes: a gravel bedding layer at the base of a silo.

In some aspects, the techniques described herein relate to a system, wherein the fluid is not water with unit density but utilize a substitute pumpable fluid with density relative to water of up to three times. Such a fluid would provide higher energy storage capacity proportional to the fluid density relative to water and would correspondingly reduce the facility unit cost of energy storage.

In some aspects, the techniques described herein relate to a system, wherein the above ground silo is constructed of prefabricated steel or timber or some combination of each. Use of these more lightweight materials for the superstructure will reduce some design loadings so will be efficient and if suitably sourced would have a lower embodied energy content.

Partially underground facilities built for storing electric energy in the form of pumped storage hydro energy are described herein. In one embodiment, the facility is split 50% below water and 50% above ground with the lower storage volume being totally below ground level and the upper level storage in the form of an elevated water storage tank. In another embodiment, the underground storage is limited, as may be required where the ground is high strength, and the lower storage cylinder diameter is increased. In another embodiment, a dry well is installed in the underground chamber to provide the most optimal location for turbine and pumps. In another embodiment, the dry well is profiled to provide the least accessible and operable cross section above the pump chamber. In another embodiment, the dry well pump chamber is replaced with submersible pumps within caisson pipes located in the lower storage tank. In another embodiment, the total facility has multiple identical facilities deployed on one site as needed for the power storage needs at reduced unit cost.

During a cycle of electric energy storage and generation, a small amount of energy is dissipated in the form of friction loss in the pump motors and electrical cabling losses. However, with appropriate design of mechanical elements, an energy efficiency of 85% or higher may be achieved, consistent with that measured in utility-scale hydro-power storage schemes. It is within the scope of this invention for design elements include, but are not limited to, a modified semi-submersible pump with more optimal differential pressure head to flow rate performance characteristics as might be available from centrifugal or Francis wheel turbines or other combinations of axial and centrifugal flow pumps. Additionally, pump-turbines might be more optimally configured in series in a single pump caisson or in parallel pump caissons and might include flexibility to instantaneously change the fluid flow from single to multi-stage pumping for best efficiency.

The proposed pumped storage tower solution may also be scaled to suit the desired power storage capacity. It is within the scope of this invention for scaled changes to include, but not be limited to, changing the cylindrical outer wall dimension, the tank diameter dimension, the supporting fluid density. For example, having an approximate diameter of 20 meters and a combined tower height and excavation depth of 350 meters would correspond to a power storage capacity of 20 MW-hour. in gravity energy per facility. If the sum of the underground depth and height were to be increased to 500 meters and for the same diameter of tank a power storage capacity of about 30 MW-hour could be achieved. Also, an increase in underground diameter, cylinder diameter and upper tank overall diameter could achieve a similar unit capability. Finally, construction of multiples of the facility could achieve significant power storage capability on one site, perhaps as much as 1 GW-hour. By the sharing of common facilities, the overall economics, redundancy and responsiveness of the power storage facility may be improved. The sharing of facilities could include joined underground chambers as described above. In such an arrangement the same power storage capacity to that described above can be achieved with a reduced excavation depth.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A modular pumped storage hydropower system, comprising:
    a shaft having a first end located opposite a second end, the first end of the shaft having a cover;
    a reservoir is connected to the first end of the shaft, the reservoir is configured to retain water;
    at least a portion of the second end of the shaft is configured to be located under a surface of ground, the second end of the shaft having a first compartment and a second compartment, the first compartment retaining a pump assembly, the pump assembly having an inlet in hydro communication with the second compartment, the second compartment is configured to support the ground and retain groundwater or surface water, if any, outside and adjacent to the shaft and retain the water within the shaft; and
    at least one pipe, the at least one pipe having a first end connected to the pump assembly located opposite a second end extending through the cover of the first end of the shaft, at least a portion of the second end of the at least one pipe is in hydro communication with the reservoir, the at least one pipe of the pump assembly is configured to transfer the water from the second compartment of the second end of the shaft to the reservoir or act as a turbine for the reverse flow of the water in the at least one pipe; and
    the water in the system is closed to the outside environment, with the exception of minor losses from evaporation or transmission through the shafts such that the system can operate in perpetuity in the absence of possible minor losses and without consideration of changes in external groundwater or surface water conditions.

2. The system of claim 1, further comprising the reservoir having a support structure extending from at least a portion of an inner wall surface from a bottom of the reservoir to a top of the reservoir.

3. The system of claim 2, further comprising the support structure having a plurality of openings.

4. The system of claim 2, further comprising a radiused cover, the cover is radiused covering the first end of the shaft.

5. The system of claim 1, wherein at least a portion of the first compartment of the second end of the shaft is tapered.

* * * * *